March 27, 1951 W. E. MELICK 2,546,608
ALARM MEANS FOR LIQUID TEMPERATURES
Filed Aug. 27, 1949
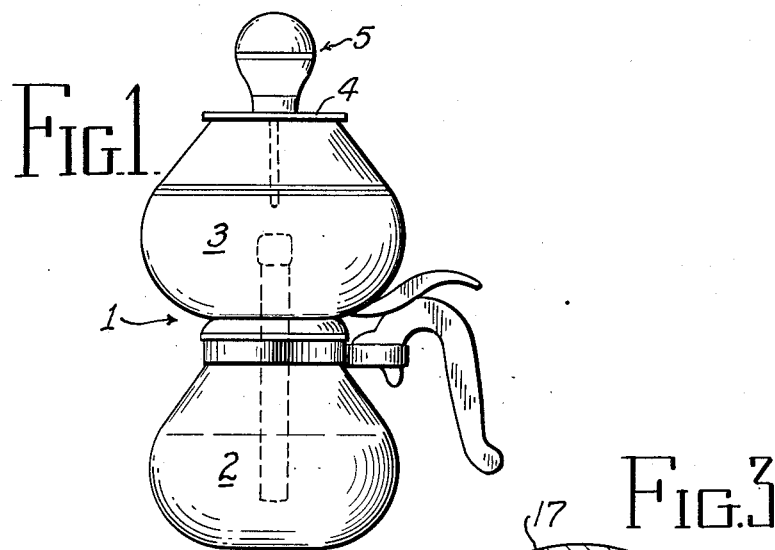
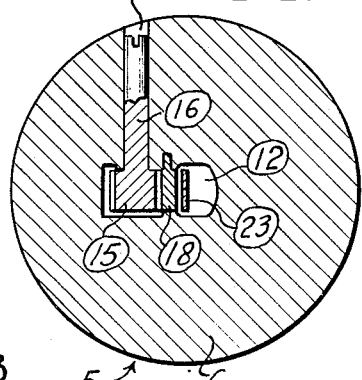
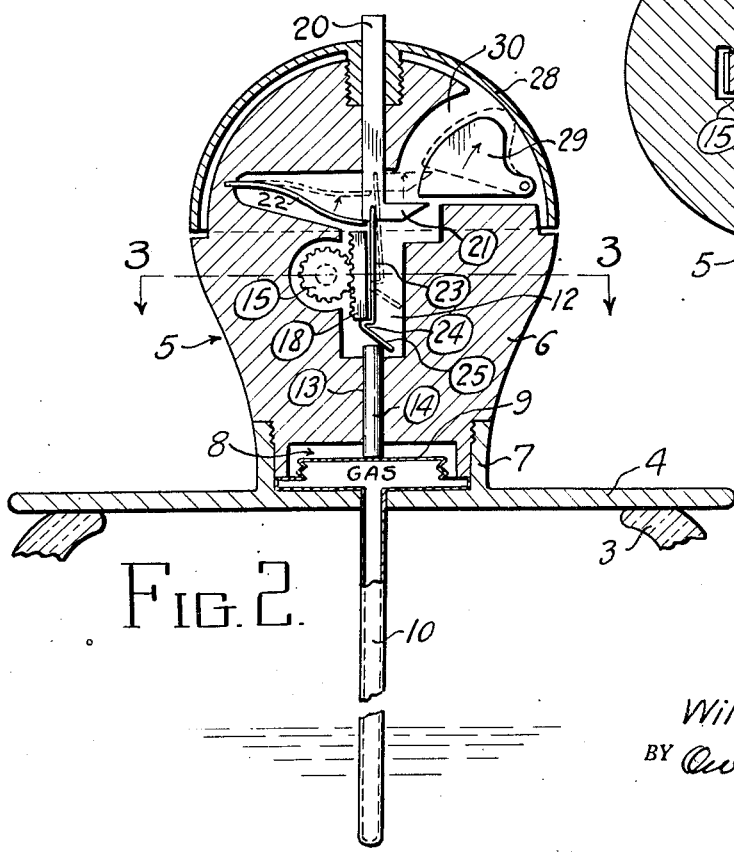
INVENTOR.
William E. Melick
BY Owen & Owen
ATTORNEYS Patented Mar. 27, 1951

2,546,608

UNITED STATES PATENT OFFICE 2,546,608

ALARM MEANS FOR LIQUID TEMPERATURES

William E. Melick, Newark, Ohio

Application August 27, 1949, Serial No. 112,673

6 Claims. (Cl. 116—102)

This invention relates to automatic temperature alarms, and particularly to one intended primarily for use in connection with coffee making devices such, for instance, as those of the infusion type.

The object of the invention is the provision of a novel alarm device of the character described that is operable by action of a thermal expansive means to sound an alarm when the temperature of coffee or other liquid in a container is raised a predetermined extent.

Further objects and advantages of the invention will be apparent from the following detailed description, and from the accompanying drawings, illustrating one embodiment of the invention, and in which—

Fig. 1 is a side elevation of a coffee making device of the infusion type equipped with the invention; Fig. 2 is a central vertical section of the cap portion thereof, in which the features of the invention reside, and Fig. 3 is a cross-section on the line 3—3 in Fig. 2.

Referring to the drawings, 1 designates a liquid coffee maker of the infusion type having the liquid container 2 and the superimposed infusion bowl 3 which are connected and operate in a manner well understood in the art. The infusion bowl has the usual top opening that is closed by a cover 4 having a centrally disposed knob 5 which may be grasped in handling the cover.

The knob 5 has a body part 6 preferably of thermal non-conductive material and this is mounted at its lower end in a nipple or hollow extension 7 on the cover 4 and cooperates therewith to form a chamber 8. In this chamber is mounted a bellows or other suitable hollow expansible member 9 having a hollow tube or extension 10 projecting downward therefrom through the cover and into the bowl 3. The lower end of the tube is closed, and it and the expansible member 9 contain a gas which itself may be thermal expansive or be actuated by a thermal expansive agent in the tube so that the expansion of the member 9 is responsive to high temperatures in the bowl.

The knob body 6 has a centrally disposed vertically elongated chamber 12 with a restricted opening 13 extending down to the chamber 8 centrally of the member 9. A plunger 14 is mounted in the opening 13 for longitudinal reciprocatory movements with its lower end resting on the member 9 and its upper end projected into the chamber 12.

In a side enlargement of the chamber 12 is disposed a rack pinion 15 that is carried by a shaft 16 journaled in a side opening 17 with its outer end exposed and notched or otherwise suitably shaped to be engaged by a screw-driver or other tool for rotary adjustment. A rack-bar 18 within the chamber 12 engages and has longitudinal adjustment imparted thereto by a turning of the pinion 15. This rack-bar during operation of the device is normally stationary.

A guiding stem 20 is mounted for longitudinal reciprocatory movements in the outer end of the knob 5 and has its outer end projected outward from the knob and its inner end projected into the upper end of the chamber 12, and provided with a laterally projecting trip finger 21. This stem is manually projected outward by a spring finger 22 that is mounted in the chamber 12 and has its free end bearing outward against the inner stem end.

A spring trip finger 23 projects downward from the lower end of the stem 20 along-side of the rack-bar 18 and has releasable catch engagement with the lower end of the bar, as shown at 24. The spring 23 terminates below this catch in a tapered or inclined portion 25 extending downwardly and outwardly away from the catch so that pressure against the exposed downwardly facing side of the incline will tend to release the spring catch from the rack-bar end. The inclined part 25 bears downward against the upper end of the plunger 14 whereby a raising of such plunger from normal position by an expansion of the member 9 frees the catch from the rackbar end, thus permitting a quick upward movement of the stem 20 and its striker 21 under the action of the spring 22.

The outer end portion of the knob 5 is enclosed by a metallic shell 28 forming a bell or resonant member that is fixed at its center to the knob and has its remaining portion free therefrom so that striking of such free portion will cause vibration and audible signal. A striker 29 for the signal member is pivotally mounted in an enlargement 30 at the upper end of the chamber 12 and normally lies in the inclined position shown with the free end of its lower edge in the path of movement of the stem finger 21. Upon a quick upward movement of the stem 20 by the action of the spring 22, when the catch finger 23 has been released, the finger 21 engages and throws the striker 29 upward and outward against the resonant part 28, and thus sounds a signal.

In the operation of the device, the liquid in the container 2 is forced up into the infusion bowl 3 in a manner well understood in the art, and when the liquid raises sufficiently to submerge the lower end of the tube 10 and the temperature of the liquid has reached a predetermined point, the thermal expansible agent in the tube will effect an expansion of the bellows or other member 9 sufficient to cause the plunger 14 to raise against the inclined end of the spring trip finger 23 and force such finger out of catch engagement with the rack-bar 18. When this occurs, the spring 22 causes a quick outward movement of the stem 20 which in turn causes the finger 21 to engage and throw the striker member 29 into alarm-sounding engagement with the member 28. Upon a contraction of the member 9, the trip finger 23 may be again forced downward into catch engagement with the bar 18 by pressure on the upper end of the stem 20. The bar 18 is adjustable by a turning of the rack pinion 15 to vary the time of tripping the spring 23 with respect to the temperature of the liquid in the bowl or container 3. It is preferable to set the tripping adjustment so that tripping occurs when the liquid temperature is at approximately 200°.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In a device having a container in which a liquid is heated, a resonant member, a striker for said member, a reciprocatory element manually movable in one direction, a spring for quickly moving said element in the opposite direction and causing it to move the striker to member striking position, a stationary catch, a spring catch carried by said element and engageable with said stationary catch to releasably hold the element in retracted position against the tension of its spring, and means responsive to temperature changes in the liquid in said container to release said spring catch from said stationary catch and permit a spring actuated movement of said reciprocatory element when the temperature of the liquid in the container has been raised a predetermined extent.

2. An arrangement as called for in claim 1 together with means for adjusting said stationary catch to vary the time of release of the spring catch in accordance with the liquid temperature.

3. An arrangement as called for in claim 1 wherein said stationary catch constitutes a rack-bar movable lengthwise of the movement of said reciprocatory element for purpose of adjustment, together with a manually rotatable pinion engaging said bar and operable to adjust its position relative to the said responsive means whereby tripping of the spring catch occurs at a predetermined higher or lower temperature.

4. In a device of the class described having an open top infusion bowl for containing a liquid, and a cover for said bowl, together with a signal sounding means mounted on said cover and comprising a resonant member, a striker for said member, a reciprocatory stem manually movable to retracted position and having a part for engaging and imparting striking movements to said striker when the stem is moved outward from retracted position, a spring acting on the stem to move it outward from retracted position, a spring catch carried by and projecting lengthwise from the stem at its inner end, said catch having its free end tapered, a stationary catch with which said spring catch engages to hold said stem in retracted position, and means responsive to temperature changes in the liquid in said container to coact with the tapered end of said spring catch and move it to release said stationary catch when the temperature of the liquid in the container has been raised a predetermined extent.

5. In a device of the class described having an open top infusion bowl for containing a liquid, and a cover for said bowl, together with a signal sounding means mounted on said cover and forming a handle therefor, said means comprising a resonant member, a striker for said member, a linearly reciprocatory stem manually movable to retracted position and having a part for engaging and imparting striking movements to said striker when the stem is moved outward from retracted position, a spring acting on the stem to move it outward from retracted position, releasable catch means for holding said stem in retracted position, and means responsive to temperature changes in the liquid in said container to release said catch means from said stem when the temperature of the liquid has been raised a predetermined extent.

6. In a device of the class described having an infusion bowl for containing a liquid to be heated, a member mounted on said bowl and having a chamber with a tube projecting therefrom into said bowl and containing a thermally expansive fluid, said chamber having a wall portion movable by internal chamber pressure, a resonant element carried by said member, a linearly reciprocatory stem mounted in said member with an end exposed for manual operation, said stem having a laterally projecting finger interiorly of the member, a striker for the resonant element mounted in said member, catch means coacting with said stem to releasably hold it in inward retracted position, means urging a quick outward movement of said stem to cause its said finger to move said striker to strike the resonant member when the catch means is released, and a plunger projecting from said movable chamber wall portion and outwardly movable to engage and release said catch means when the fluid in the chamber has expanded a predetermined extent.

WILLIAM E. MELICK.

REFERENCES CITED

The following references are of record in the file of this patent:

FOREIGN PATENTS

| Number | Country | Date |
|---|---|---|
| 39,620 | Switzerland | Oct. 4, 1907 |
| 389,031 | Germany | Jan. 24, 1924 |
| 631,696 | Germany | June 25, 1936 |